Aug. 9, 1955     J. M. HENDRICKSON     2,714,724
SPECIAL OUTLET BALL VALVE FOR CLOSET FLUSH TANKS
Filed Dec. 29, 1951     3 Sheets-Sheet 1

INVENTOR
J. M. HENDRICKSON,
BY
ATTORNEY

Aug. 9, 1955      J. M. HENDRICKSON      2,714,724
SPECIAL OUTLET BALL VALVE FOR CLOSET FLUSH TANKS

Filed Dec. 29, 1951      3 Sheets-Sheet 2

INVENTOR
J. M. HENDRICKSON,

BY

ATTORNEY

Aug. 9, 1955   J. M. HENDRICKSON   2,714,724
SPECIAL OUTLET BALL VALVE FOR CLOSET FLUSH TANKS
Filed Dec. 29, 1951   3 Sheets-Sheet 3

INVENTOR
J. M. HENDRICKSON,
BY
ATTORNEY

United States Patent Office 2,714,724
Patented Aug. 9, 1955

2,714,724

SPECIAL OUTLET BALL VALVE FOR CLOSET FLUSH TANKS

James M. Hendrickson, Kittanning, Pa., assignor, by mesne assignments, to The Murray Corporation of America, Detroit, Mich., a corporation of Delaware Application December 29, 1951, Serial No. 264,164

5 Claims. (Cl. 4—57)

This invention relates to certain improvements in water closet flush tanks and more specifically to a novel float valve construction and arrangement therefor.

The object of the invention is to provide a relatively simple and inexpensive float valve and operating means for flush tanks, comprising the minimum number of operating parts yet at the same time producing a practical and efficiently working fixture.

A further object is to improve that type of float valve for flush tanks, wherein the valve float or ball is suspended from a relatively long, flexible member carried by an operating lever arm or the like of the conventional type. In said former construction, by reason of the long flexible connection, the ball float is permitted to wander or circulate within the tank when the valve is opened and there is no assurance that said ball will finally come to rest on the outlet valve seat to close the valve after all the water is discharged and prior to the refilling of the tank.

It is therefore a further object and an important object of this invention to retain the simplicity of these former constructions but at the same time provide a more positive and assured operation of this type of float valve for water closet float tanks.

Another object of the invention is to obtain an improved working of these flush tank float valves by the proper positioning and mounting of the operating lever arm with respect to the valve seat in combination with a novel connection between the inner end of said lever and the ball float, whereby the bodily movements of the ball will be restrained to a limited extent and said ball will at all times be positively guided during the opening and closing of said valve, yet at all times permitting a free axial rotation of said ball which is very important during the seating of the ball to close the valve and thereby contributing in a great measure to the successful operation of the structure as a whole.

The preferred embodiment of the invention is illustrated in the accompanying drawings in which:

Figure 3 illustrates another form of ball float comprising a hollow sphere of light metal or other suitable material coated with a layer of rubber or the like.

Figure 7:
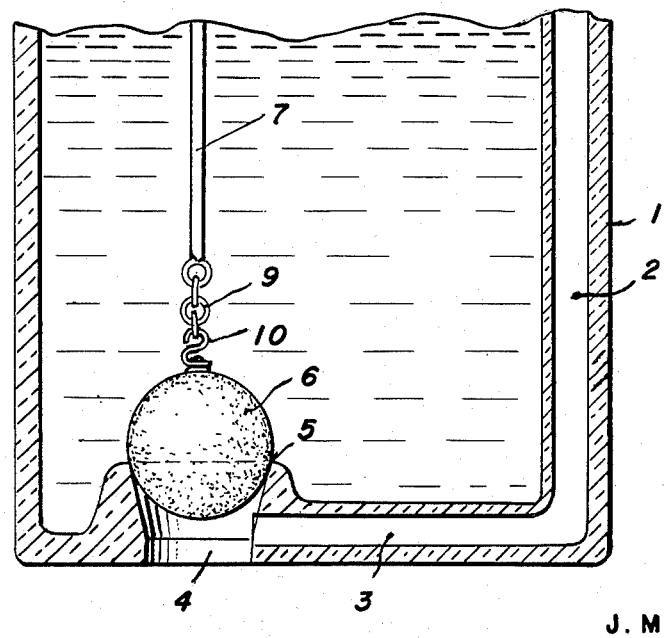
Figure 7 is a sectional view on the line 7—7 of Figure 1 showing the manner of integrally forming the valve seat at the termination of the integrally formed overflow for the flush tank.

Referring to the drawings in detail, the invention is illustrated in connection with a flush tank 1 preferably constructed with an integral overflow passageway or conduit 2 carried by the rear wall of the tank and extending down to the bottom of said tank and transversely across said bottom as at 3 to communicate and with the discharge outlet 4 of said tank, as illustrated in Figure 7.

Figure 1:
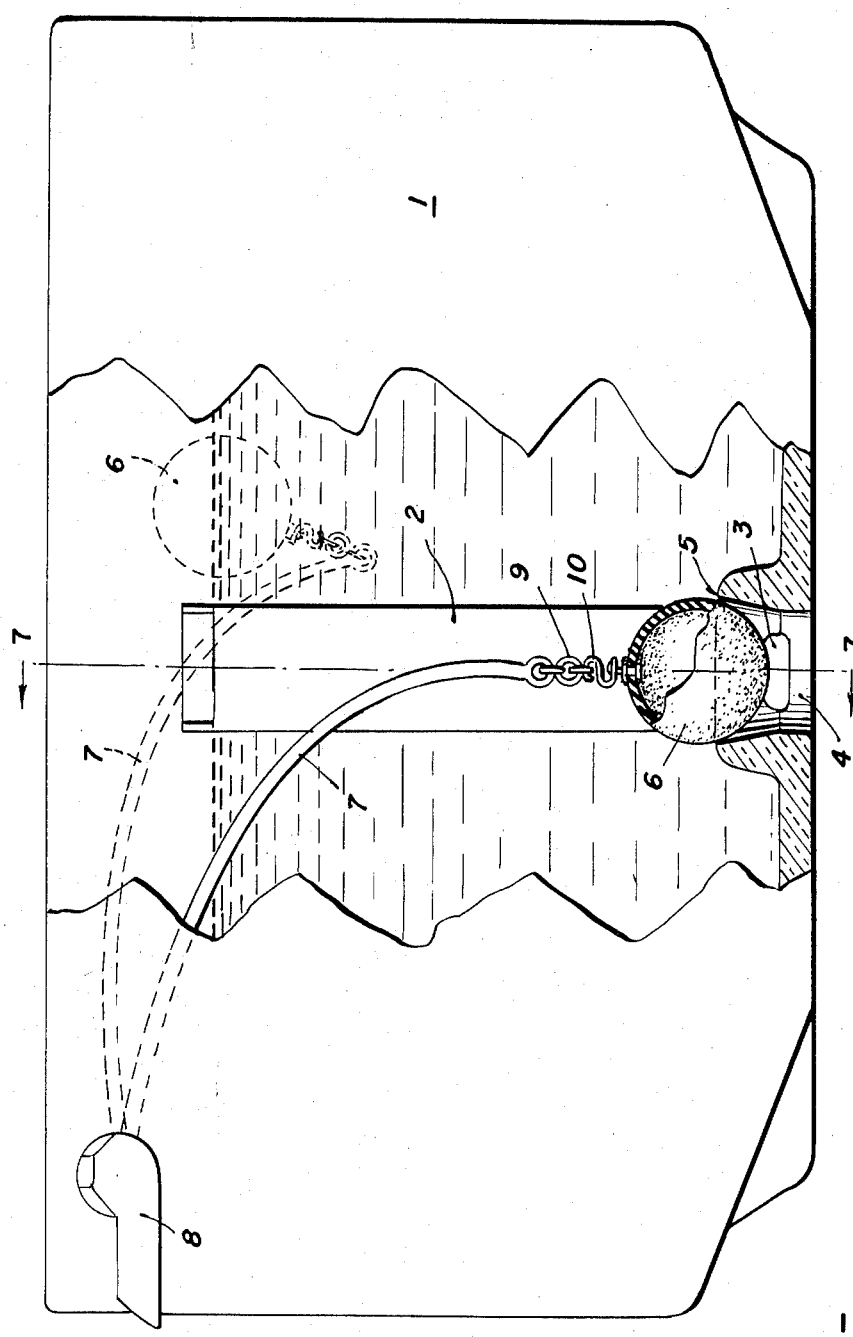
Figure 1 is a view partly in elevation and partly in section of the improved float valve assembly using a hollow rubber ball mounted in a water closet flush tank having an integrally formed overflow water discharge outlet and valve seat for said outlet.
Figure 2:
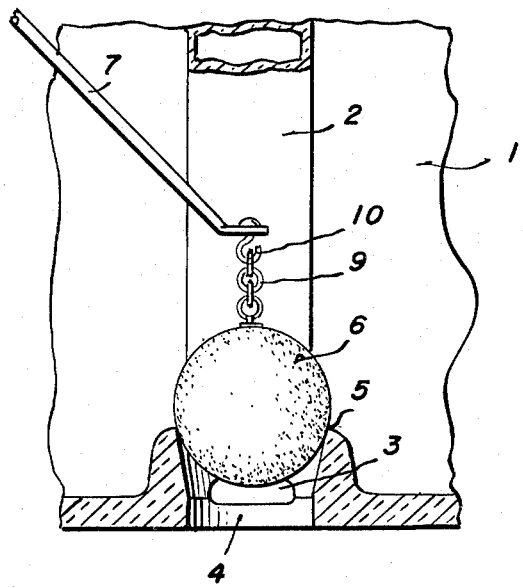
Figure 2 is a modification illustrating a straight lever arm and the flexible connection between the ball float and said lever arm is supported from a swivel directly carried by the end of said arm, as distinguished from Figure 1 wherein the swivel is directly connected to the ball float.

The upper side of this conduit 2 directly above the discharge outlet 4 is provided with an integral valve seat 5 properly formed and ground to receive a float valve 6. As illustrated in Figures 1 and 2, this float valve 6 is a hollow sphere preferably constructed of rubber of sufficient thickness to maintain its shape at all times during the operation of the device, but said float valve may be constructed of thin metal or the like with a resilient coating of rubber as will be hereinafter more fully described.

Pivotally mounted on the inside of the front wall of the flush tank, is an arm or rod 7 provided with an outside operating lever handle 8, said arm 7 extending downwardly within the tank with its lower end relatively close to and immediately above the valve seat 5, as clearly shown in Figures 1 and 2.

Suspended from said lower end of the lever arm 7 is a short linkage or flexible connection 9 having its lower end secured to the float valve 6 by a swivel 10, whereby said float valve will be limited in its movements with respect to the lever arm 7 and also be permitted to rotate axially, for the purpose to be hereinafter more fully set forth. Referring to Figure 2, this swivel 10 may be carried by the lever arm 7 as an alternate arrangement to produce the same result.

As illustrated in Figure 1, this lever arm 7 is downwardly curved but said arm will be equally effective when made straight as illustrated in Figure 2, provided the inner end thereof in each form, when at rest, is properly positioned with respect to the valve seat, whereby only a short section of chain or the like will be necessary to provide a proper seating of the float valve 6. At the same time, when said float valve is unseated by the raising of the lever arm 7, said float valve will always remain in close proximity to the end of said arm and will not be permitted to wander or circulate around the inside of the tank following a flushing operation and during the refilling of said tank, as distinguished from all former apparatus of this general type, wherein the float valve was secured to its operating mechanism by a relatively long and substantially uncontrolled flexible connection.

With these former devices this relatively free circulation of the float valve within the tank, after a flushing operation, and during the subsequent refilling of the tank, resulted in a very unsatisfactory and uncertain operation and there was no assurance that the float valve at all times would properly seat itself to close the tank outlet.

With applicant's low-down lever arm and short flexible connection for the float valve, said float valve will always be returned to a position close to the valve seat where it can and will roll into position due to the suction created by the discharge of the water, to tightly close the outlet opening in the tank and remain closed during the refilling of said tank.

Figure 6:
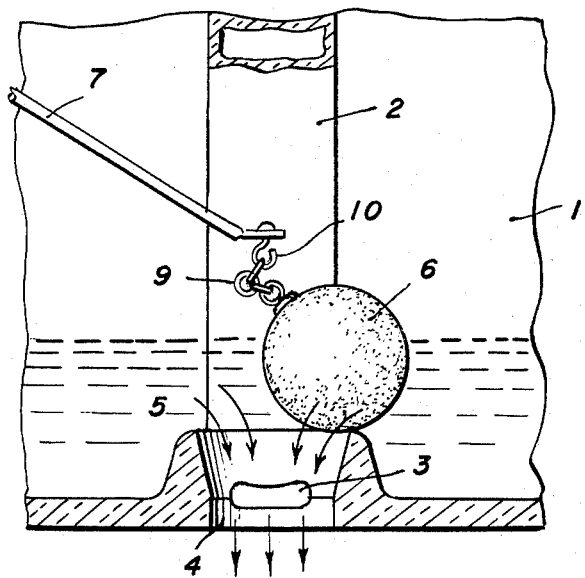
Figure 6 is a view partly in elevation and partly in section showing the position of the float valve just prior to seating and closing the tank outlet.

If the float valve is sufficiently buoyant, it will rise to the surface of the water in the tank when unseated by the lever arm, supporting the lever arm as illustrated in dotted lines in Figure 1 and gradually descend with the water level until the lower end of the lever arm is in its lowermost position, at which point, due to the short swivel connection between the float valve and the end of the lever arm, said float valve will be drawn close to the valve seat in position to roll into said seat and close the same during the final discharge of the water from the tank as clearly illustrated in Figure 6.

If the weight of the lever arm is sufficient to overcome the buoyancy of the float valve, when said float valve is raised from its seat during a flushing operation, said float valve will simply float above the lower end of the lever arm until the water level reaches the same, whereupon it will fall with the discharging water and assume its seating position in the manner as above described.

Figure 3:
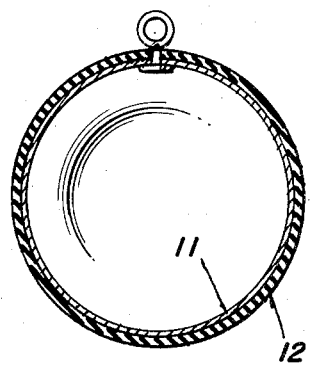
Figure 4:
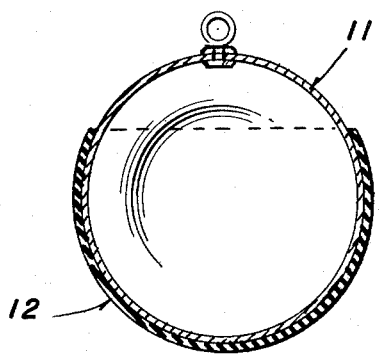
Figure 4 is another modification wherein the rubber coating covers approximately three fourths of said ball float.
Figure 5:
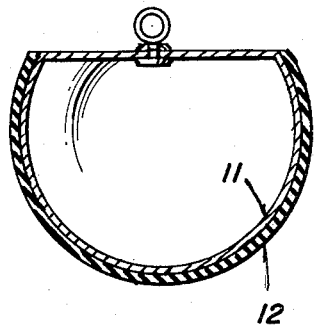
Figure 5 is a further modification showing a semi-spherical rubber coated ball float.

As previously stated, the float valve may be formed as a hollow rubber sphere as illustrated in Figures 1 and 2, or it may be constructed of thin sheet metal or plastic 11 with a coating of rubber or the like 12, as illustrated in Figures 3, 4 and 5.

Also, it may not be necessary to coat the entire sphere but only so much as will contact the valve seat during the operation of the device, as shown in Figure 4, wherein the said rubber coating 12 covers about three fourths of the float valve surface.

As a further modification, the float valve may be of the semi-spherical form as illustrated in Figure 5, the rubber coating being applied only to the curved surface thereof.

In view of the above description it is believed the operation of the device will be perfectly clear. When the lever handle 8 is rotated, the lever arm 7 is raised, lifting the float valve 6 from its seat 5 and the water is released from the tank to perform the flushing operation. The float valve will rise and remain clear of the seat 5, but in view of the short flexible connection with the lever arm 7, said float valve will be returned to a position close to the edge of the valve seat 5 as the lever arm assumes its lowermost position. As the last of the water leaves the tank, passing through the valve seat, the float valve will be drawn or rolled into the valve closing position, further aided by the swivel connection between said float valve and the lever arm.

What I claim is:

1. In a water closet flush tank, the combination with a discharge opening in the bottom of said tank, of a float valve for said opening, a lever arm pivotally mounted in said tank for operating said float valve, the inner end of said lever arm extending downwardly to a point immediately above the center and closely adjacent said opening when said float valve is in closed position, and a relatively short flexible connection between said float valve and the lower end of said lever arm, said flexible connection being of such length that the ball will at all times be positively guided back to the discharge opening in seating position, by the lower end of said lever.

2. In a water closet flush tank, the combination with a discharge opening in the bottom of said tank, of a valve seat for said opening, a float valve for said seat, a lever arm pivotally mounted in said tank for operating said float valve, the inner end of said lever arm extending downwardly to a point immediately above the center and closely adjacent said valve seat when said float valve is in closed position, and a relatively short flexible swivel connection between said float valve and the lower end of said lever arm, said flexible connection being of such length that the ball will at all times be positively guided back to the discharge opening in seating position, by the lower end of said lever.

3. In a water closet flush tank, the combination with a discharge opening in the bottom of the tank, of a valve seat for said opening, a spherical float valve for said seat, a lever arm pivotally mounted in said tank for operating said float valve, the inner end of said lever arm extending downwardly to a point immediately above the center and closely adjacent said valve seat when said float valve is in closed position, and a relatively short flexible swivel connection between said float valve and the lower end of said lever arm, said flexible connection being of such length that the ball will at all times be positively guided back to the discharge opening in seating position, by the lower end of said lever.

4. In a water closet flush tank, the combination with a discharge opening in the bottom of said tank, of a valve seat for said opening, a resilient spherical float valve for said valve seat, a lever arm pivotally mounted in said tank for operating said float valve, the inner end of said lever arm extending downwardly to a point immediately above the center and closely adjacent said valve seat when said float valve is in closed position, and a relatively short flexible connection between said float valve and the lower end of said lever arm, said flexible connection being of such length that the ball will at all times be positively guided back to the discharge opening in seating position, by the lower end of said lever.

5. In a water closet flush tank provided in its bottom with an integral overflow, and outlet valve seat, the combination with a substantially spherical hollow cushioned float valve adapted to conform to said seat, a lever arm pivotally mounted in said tank for operating said float valve, the inner end of said lever arm extending downwardly to a point immediately above the center and closely adjacent said seat when said float valve is in closed position, and a relatively short swiveled link connection between said float valve and the inner end of said lever arm, said flexible connection being of such length that the ball will at all times be positively guided back to the discharge opening in seating position, by the lower end of said lever.

References Cited in the file of this patent

UNITED STATES PATENTS

| | | |
|---|---|---|
| 369,843 | Douglas | Sept. 13, 1887 |
| 1,018,937 | Snaman | Feb. 27, 1912 |
| 1,941,549 | Gannon | Jan. 2, 1934 |
| 2,014,600 | Wayne | Sept. 17, 1935 |
| 2,142,393 | Halteman | Jan. 3, 1939 |
| 2,230,613 | Deady | Feb. 4, 1941 |
| 2,328,701 | Woodrum | Sept. 7, 1943 |
| 2,599,940 | Rickena | June 10, 1952 |